UNITED STATES PATENT OFFICE.

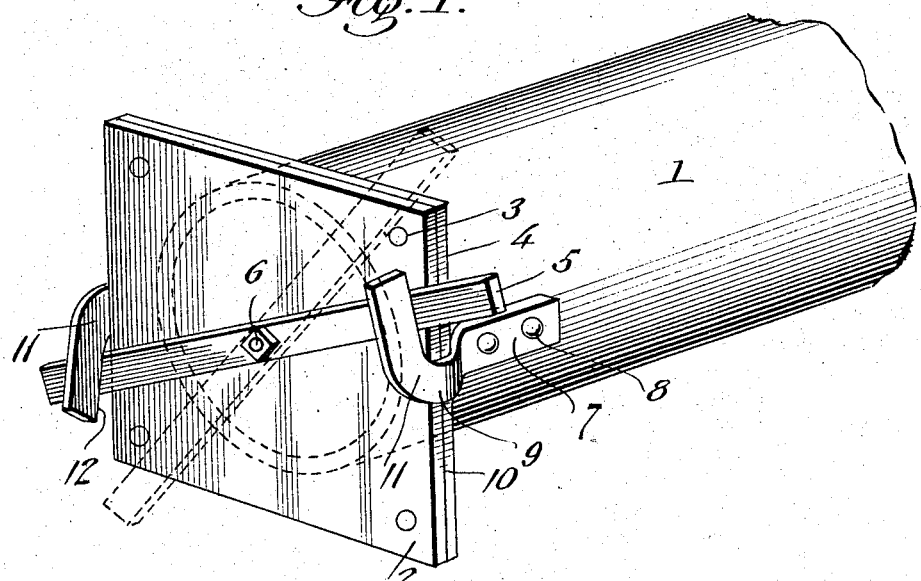
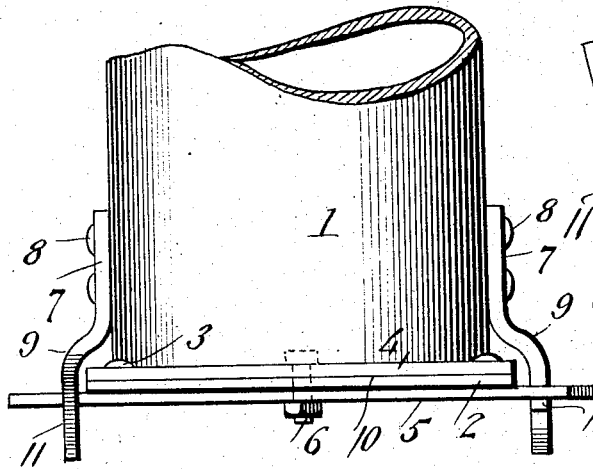
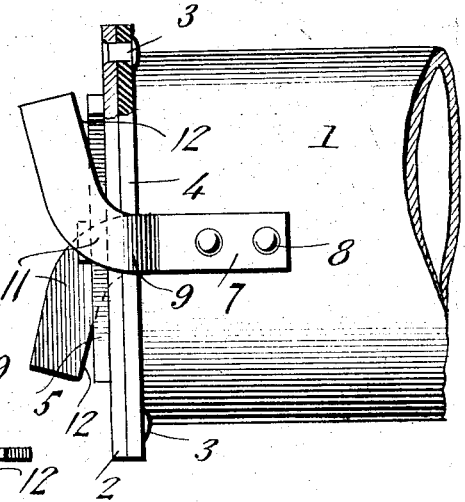

URIAH SERVISS, OF GRIDLEY, CALIFORNIA.

IRRIGATION WATER-GATE.

1,062,042.  Specification of Letters Patent.  Patented May 20, 1913.

Application filed February 11, 1913. Serial No. 747,644.

*To all whom it may concern:*

Be it known that I, URIAH SERVISS, a citizen of the United States of America, residing at Gridley, in the county of Butte and State of California, have invented certain new and useful Improvements in Irrigation Water-Gates, of which the following is a specification.

The invention relates to an improved water gate for use in irrigation work, being particularly directed to a gate adapted for ready connection with or removal from the flume or pipe to check the flow of water therefrom.

The main object of the present invention is the provision of a water gate adapted to be applied to close the end of the pipe or flume and provided with simple locking means whereby it may be secured in pipe-closing position against the flow of water under the pressures ordinarily employed in irrigation work.

The invention in its preferred form of details will be described in the following specification, reference being had particularly to the accompanying drawings, in which:—

Figure 1 is a perspective view illustrating the application of my improvement. Fig. 2 is a broken plan of the same. Fig. 3 is an elevation, partly in section, of the same.

Referring particularly to the accompanying drawings, wherein like parts are indicated by like characters of reference throughout the several views, my improved gate, which is designed to close the discharge end of a flume or pipe 1 comprises a plate or disk 2 of approximately rectangular outline and of appropriate dimensions to extend an appreciable distance beyond the exterior surface of the flume or pipe when in operative relation to the end thereof. Secured through the medium of rivets 3 upon the inner face of the disk 2 and coincident in dimensions therewith is a washer 4. Mounted upon the outer surface of the disk 2 is a locking lever 5, the same being centrally pivoted through the medium of a removable, threaded bolt 6 passing through the disk and washer 4 and maintaining said disk and washer in stable contact. The lever exceeds in length the diameter of the disk so that the ends of the lever project beyond the edges of the disk. Secured to the flume or pipe 1 in diametrically opposed relation are hooks 7, each preferably constructed of a single length of material and secured at one end in flat relation to the flume or pipe by rivets or the like 8. Beyond the secured section the material of the hook is offset, as at 9 to permit clearance of the side edges 10 of the disk 2 and washer 4, and then terminally projected upward to form a bill or retaining member 11, said member being slightly flared outwardly to provide an inclined inner edge 12, the latter gradually approaching from the free terminal of the hook toward the end of the flume.

The hooks 7 are arranged in diametrically opposed positions and in opposition to each other, that is with the hook of one opening upwardly and the hook of the other opening downwardly. The hooks are so secured to the flume that their inner edges 12 of the bill portions are spaced a proper distance from the end of the flume to insure, when the disk is operatively positioned and the lever is turned to engage the hooks, a binding action between said lever and hooks, resulting, as the lever is seated, in an increasing pressure of the disk against the edge of the flume to maintain a water-tight connection between said pipe and washer 4.

From the above description it will be obvious that the improved gate may be readily connected to or disconnected from the flume, that when removed there is no obstruction to the free passage of water from the flume, the salient feature of the present invention residing in the provision of a pivoted locking lever for the gate which is adapted to engage reversely located hooks on the flume and to exert inward pressure on the gate through the relative positioning of said hooks and lever.

Having thus described my invention, what I claim as new and desire to secure by Letters Patent, is:—

The combination with a flume or pipe having diametrically opposed hooks opening in opposition to each other, of a gate comprising a disk, a washer secured to the inner surface of the disk to engage the end of the pipe, a lever pivotally mounted upon the outside of the disk and designed to terminally engage the hooks of the pipe, said hooks being provided with inclined bearing surfaces adapted to contact with the lever whereby to tension the lever when in locking position to induce pressure upon the disk.

In testimony whereof I affix my signature in the presence of two witnesses.

URIAH SERVISS.

Witnesses:
R. C. LONG,
EDWIN C. MILLER.

Copies of this patent may be obtained for five cents each, by addressing the "Commissioner of Patents, Washington, D. C."